Figure 1:
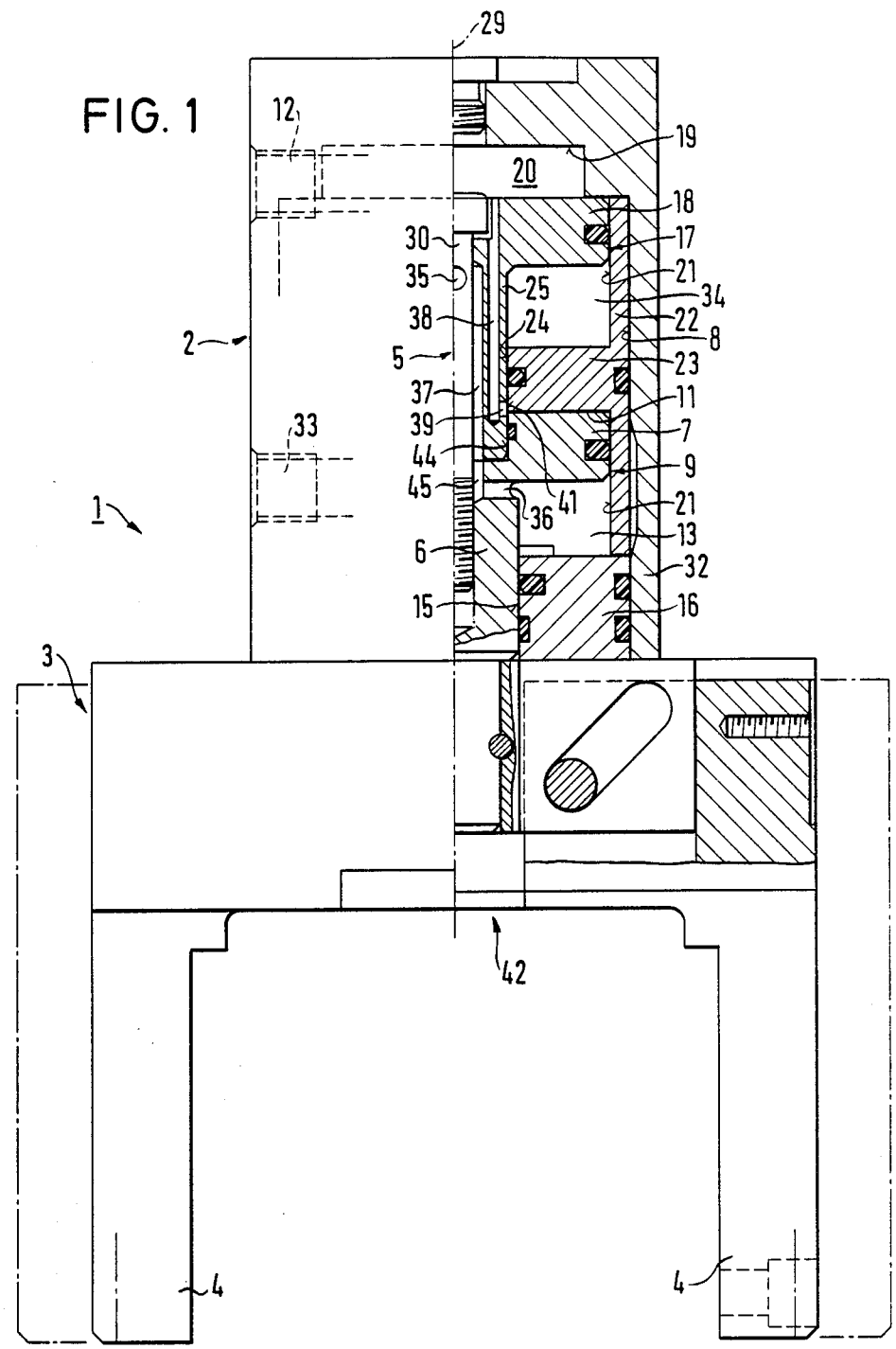

United States Patent [19]

Kratzer

[11] Patent Number: 4,729,588
[45] Date of Patent: Mar. 8, 1988

[54] GRASPING DEVICE FOR HANDLING EQUIPMENT

[75] Inventor: Wilhelm Kratzer, Billigheim, Fed. Rep. of Germany

[73] Assignee: Fibro GmbH, Weinsberg, Fed. Rep. of Germany

[21] Appl. No.: 923,947

[22] Filed: Oct. 28, 1986

[30] Foreign Application Priority Data

Dec. 13, 1985 [DE] Fed. Rep. of Germany ....... 3544130

[51] Int. Cl.⁴ ............................................. B25J 15/00
[52] U.S. Cl. ..................................... 294/88; 294/115
[58] Field of Search ................. 294/88, 100, 106, 115, 294/116, 95, 97, 86.4; 269/25, 34, 203, 233, 234; 901/31, 36, 37, 38, 39; 414/739, 753; 267/121

[56] References Cited

U.S. PATENT DOCUMENTS

| | | | |
|---|---|---|---|
| 3,945,676 | 3/1976 | Asamoto | 294/88 |
| 4,513,953 | 4/1985 | Molders et al. | 267/121 |
| 4,540,211 | 9/1985 | Masserang | 294/88 |
| 4,607,873 | 8/1986 | Nusbaumer et al. | 294/115 |

*Primary Examiner*—James B. Marbert
*Attorney, Agent, or Firm*—Townsend and Townsend

[57] ABSTRACT

A grasping device for handling equipment has clamping fingers (4) which are movable relative to one another and an actuating device (5) for the clamping fingers which consists of piston-in-cylinder units (9, 17) which are coaxially arranged one behind the other and coupled in force transmitting manner. These piston-in-cylinder units are energized in the same sense by the pressure medium. This space saving construction makes it possible to achieve high clamping forces for a given pressure of the pressure medium while maintaining compact external dimensions of the grasping device.

16 Claims, 3 Drawing Figures

GRASPING DEVICE FOR HANDLING EQUIPMENT

The invention relates to a grasping device for handling equipment comprising a clamping device having at least two clamping fingers which are movable relative to one another and are mounted on a housing; and a clamping finger actuating device provided in the housing and consisting of a piston-in-cylinder arrangement.

Such grasping devices are already widely used and serve for the grasping of articles. In cases in which the articles to be grasped are located at positions to which access is difficult, or must be transported by the handling equipment to positions where access is difficult, situations can arise in which, for a predetermined high grasping force, the dimensions of the grasping device are too large for it to be possible to reach these positions. In this case the dimensions of the grasping device must be made smaller, however without a reduction of the grasping force.

If a smaller grasping device of this kind has to provide a high clamping force then a very high pressure of the pressure medium, for example a pressure fluid, is necessary because of the small piston diameter. However the level of the pressure in the pressure fluid is restricted by the thickness of the pressure medium supply hoses, which increases with increasing pressure, and by the inflexibility which is associated therewith, and also by safety and reliability considerations. Thus, for a predetermined maximum pressure of the pressure fluid and with a predetermined clamping force, physical limits are set on the reduction in size of such grasping devices and these limits are determined by the size of the piston.

It is accordingly the principle object underlying the present invention to provide a grasping device of the initially named kind which provides a high clamping force for a given pressure of the pressure fluid, while retaining or providing compact external dimensions.

In order to satisfy this object the present invention provides that the clamping finger actuating device comprises at least first and second piston-in-cylinder units coaxially disposed behind one another which are coupled together in force transmitting relationship and are energizable with pressure fluid in the same sense.

The particular advantage of the grasping device of the invention is that a space saving layout of the grasping device is made possible by the arrangement of the piston-in-cylinder units coaxially behind one another while simultaneously providing a slender form for the housing. In this way the external dimensions of the entire grasping device can be kept small so that it can also be used in handling operations in which the freedom of movement of the handling equipment is restricted.

In a particularly advantageous construction the force transmitting coupling comprises at least one threaded connection between the piston of said first and second piston-in-cylinder units. In this construction the threaded connection ensures a force transmitting coupling for axial movements in both directions.

A further development of the invention is characterised in that the cylinders of said first and second piston-in-cylinder units are separated from each other by a transverse cylinder-partitioning wall; and in that the piston of the second piston-in-cylinder unit is provided with a central projection which passes sealingly through said transverse cylinder partitioning wall and contacts the piston of said first piston-in-cylinder unit, which is disposed adjacent said clamping fingers, with said piston projection defining said force transmitting coupling. This arrangement has a simple layout so that the installation of the piston-in-cylinder units can be carried out rapidly and simply.

With this latter arrangement the force transmitting coupling further comprises an axially disposed threaded fastener, in particular a bolt, which extends from one of said pistons to the other said piston through said piston projection. In this advantageous development the axially disposed threaded fastener, which is preferably a simple threaded bolt, ensures that the pistons can be conveniently screwed together without the danger of the pistons being forced out of alignment in the axial direction.

The specific layout is preferably such that the piston of the first piston-in-cylinder unit is also provided with a piston projection; and such that said threaded fastener has a head which bears on the piston of said second piston-in-cylinder unit and threads which engage in a threaded bore in said piston projection of the piston of said first piston-in-cylinder unit.

A particularly preferred embodiment is characterised in that each of said piston-in-cylinder units has a respective pressure chamber on one side of the associated piston and a respective resetting chamber on the other side of the associated piston; and in that passage means is provided for connecting the pressure chamber of said first piston-in-cylinder unit to the pressure chamber of said second piston-in-cylinder unit. The passage means is provided in said piston projection. Further passage means is conveniently provided for connecting said resetting chambers to each other. The further passage means is conveniently provided in the piston of said first piston-in-cylinder unit and in said piston projection.

In these advantageous constructions a simple layout of the piston-in-cylinder arrangement is possible because it is not necessary for a separate fluid supply duct to pass through the housing to each individual pressure chamber or resetting chamber. In the present case it is only necessary to provide one pressure or resetting chamber with a pressure fluid supply because the other pressure and resetting chambers are fed with pressure fluid via associated passages in the pistons and in the piston projections from the chambers which are directly supplied from the outside.

An alternative embodiment is characterised in that at least one compression spring is arranged in at least one of said resetting chambers and exerts an axial resetting force on the associated piston. Here the resetting force is built up by compression spring force, so that in this case it is not necessary to supply pressure fluid to the resetting chambers.

In a particularly advantageous layout the cylinders of said piston-in-cylinder units are formed by a cylinder sleeve arranged in a bore of the housing; and the transverse cylinder-partitioning wall is formed on the cylindrical sleeve. This makes it possible to use different materials for the manufacture of the housing and of the cylinder sleeve, so that the housing can, for example, be manufactured in a cast alloy and can have a relatively rough surface for the housing bore, while the surface quality of the internal cylinder wall required to seal between the piston and the cylinder wall can be ensured by using a cylinder sleeve of high quality material.

In order to make the cylinder sleeve easier to install the latter can expediently be made in a plurality of parts.

It is also possible, in particular with an embodiment utilising a cylinder sleeve, for the passage means for transferring pressure fluid from one pressure chamber to the other and/or for the further pressure means for transferring pressure fluid from one resetting chamber to the other, to be provided in the cylinder wall (or sleeve).

This is advantageous because it is possible to use simply constructed pistons.

The grasping device of the invention can be used both for a clamping device with fingers which move parallel to each other and for a clamping device with fingers which move at an angle to one another.

The invention will now be described in the following with reference to examples and to the drawings which show:

FIG. 1 a partly sectioned grasping device having clamping fingers which move parallel to one another, the grasping device being both actuated and reset by a pressure fluid.

Figure 2:
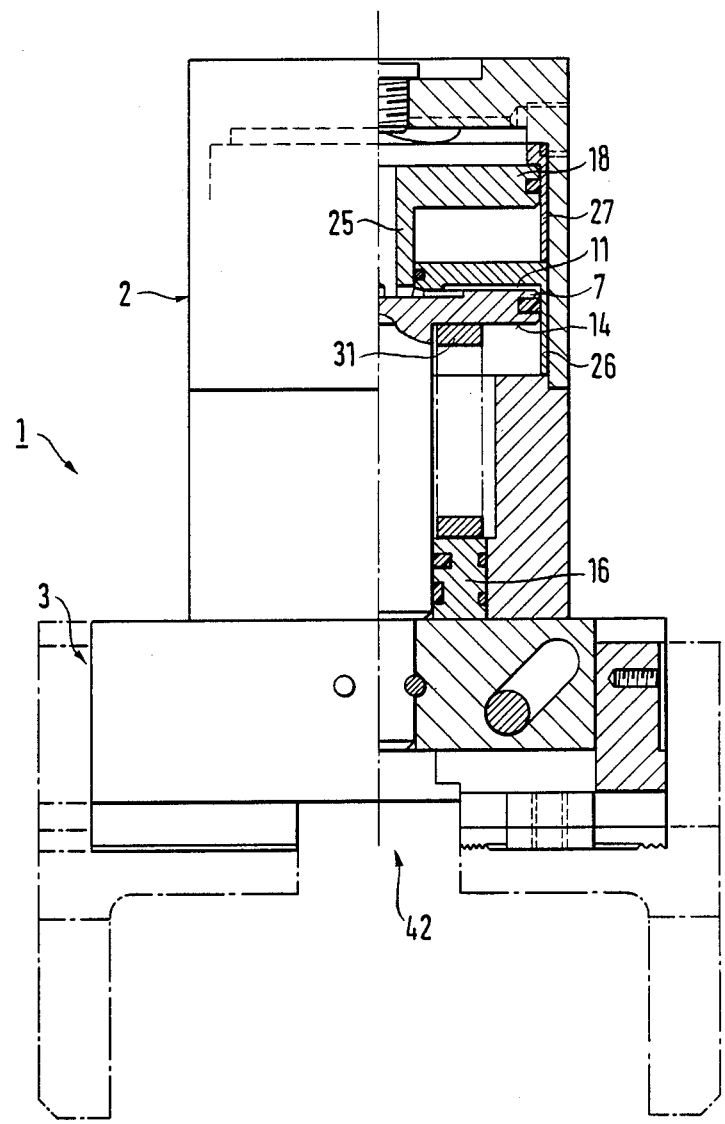
Figure 3:
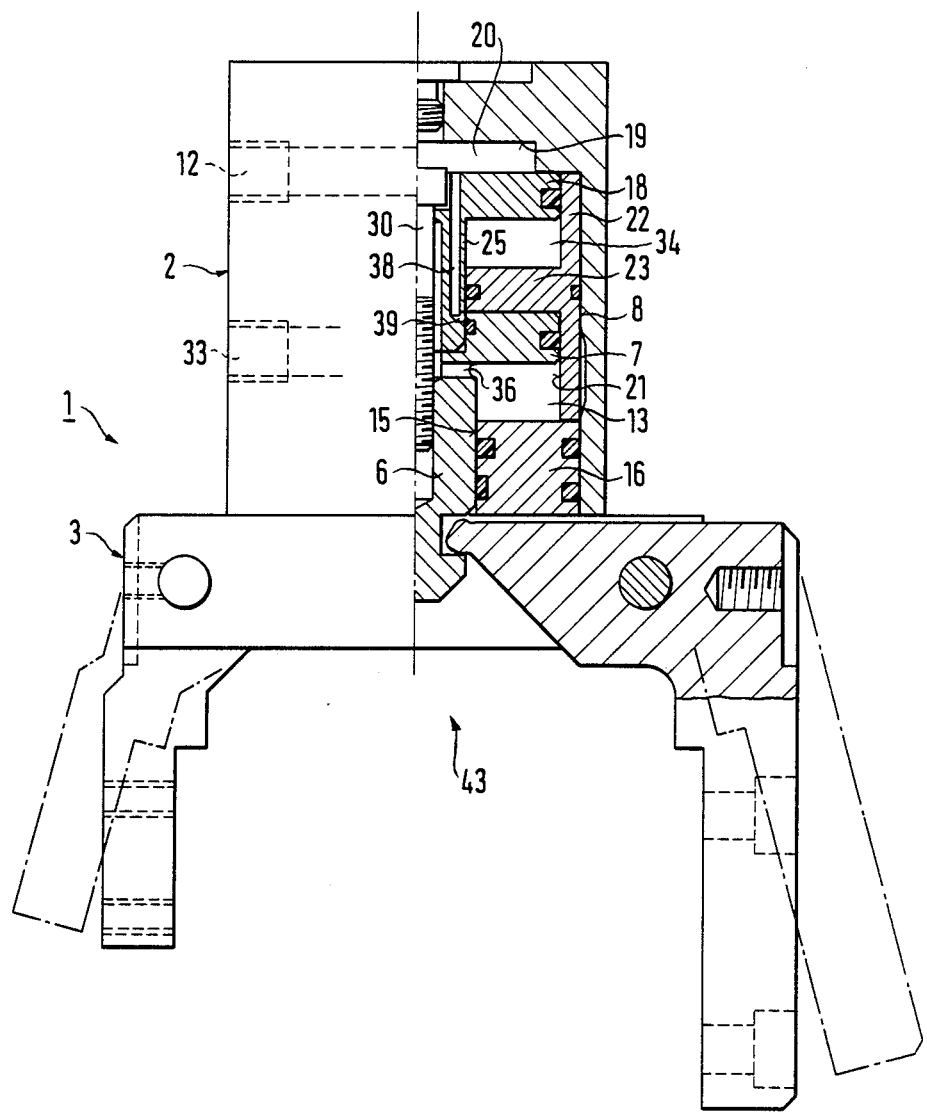

FIG. 2 shows a partially sectioned grasping device similar to FIG. 1 in which the resetting of the grasping device is effected by a spring, and FIG. 3 shows a grasping device in accordance with the invention but provided with clamping fingers which move angularly relative to one another.

As seen in FIG. 1 a housing bore 8 which is open at one end is provided in a housing 2 of a grasping device in accordance with the invention. A housing plug 16 with a central guide passage 15 is inserted into the opening of the housing bore 8 at a first end face of the housing. A cylinder sleeve 22 is arranged within the housing bore 8 and sealingly contacts the housing bore 8 in the central region along the length of the cylinder sleeve. At this position the cylinder sleeve has a transverse cylinder-partioning wall 23 with a central opening 24.

The transverse cylinder-partioning wall 23 thus divides the assembly into first and second cylinders on respective sides of said wall.

A first piston 7 is axially displaceably mounted within the first cylinder and is sealed relative to the internal cylinder wall 21 of the first cylinder. The first cylinder being enclosed by the housing plug 16, the cylinder sleeve 22 and the transverse cylinder-partioning wall 23. This first piston 7 is provided with a central piston projection 6 which is sealingly guided through the central passage 15. The first piston has a central, blind bore-like cut-out 44 at its side facing away from the piston projection 6. A central piston projection 25 of a second piston 18 which is sealingly guided through the central opening 24 of the transverse cylinder-partioning wall 23 is sealingly inserted into this cut-out 44.

The second piston 18 is axially displaceably mounted within the second cylinder, and is sealed relative to its internal wall. The second cylinder being enclosed by the transverse cylinder-partioning wall 23, by the inner cylinder wall 21 and by the second end face or end wall 19 of the housing. The two pistons 7, 18 are connected together by a bolt 30. The bolt 30 passes through a central bore of the second piston and its piston projection, and also through the first piston and, is threaded into a screw thread in the piston projection 6 of the first piston.

A first pressure chamber is formed in operation between the first piston 7 and the transverse cylinder-partioning wall 23.

A second pressure chamber 20 is formed in the housing between the second piston 18 and the end wall 19 of the housing. The second pressure chamber 20 is connectable with a first pressure supply means via a first connection duct 12 which leads through the housing wall 32. An axial bore 38 extends from this second pressure chamber 20 through the second piston 18 into the piston projection 25. The axial bore 38 communicates with a first radial bore 39 formed in the end region of the piston projection 25 remote from the second piston 18. The radial bore 39 is actually formed at the level of the upper surface of the first piston 7, i.e. at the level of the opening of the cut-out 44 in the first piston 7, and terminates at an opening 41 at the surface of the piston projection 25.

In this way pressure fluid is communicated from the second pressure chamber 20 to the first pressure chamber formed between the first piston 7 and the transverse cylinder-partioning wall 23.

A first resetting chamber 13 is formed between the first piston 7, the inner wall 21 of the cylinder, the housing plug 16 and the piston projection 6 and is connectable via a second connection duct 33 in the housing wall 32 with a second pressure supply means. A second resetting chamber 34 is bounded by the second piston 18, by the piston projection 25, by the transverse cylinder-partioning wall 23 and by the inner cylinder wall 21. The second resetting chamber 34 is connected to the first resetting chamber. This connection takes place via a second radial bore 35 in the piston projection 25, a further axial bore 37 in the piston projection 25 and also via a third radial bore 36 arranged in the transition region between the first piston 7 and the associated piston projection 6. The further axial bore 37 is conveniently defined between the threaded fastener 30 and the cylindrical wall of the clearance bore in the second piston projection through which it passes.

The position of the piston of the grasping device shown in FIG. 1 is changed by forcing a pressure medium into the second pressure chamber 20 through the first connection duct 12. On doing this both the second piston 18 and the first piston, which is connected to the second piston via the piston projection 25 and the threaded fastener 30, move downwardly, together with the piston projection 6 formed on the first piston 7. As the first pressure chamber between the first piston 7 and the transverse cylinder-partioning wall 23 opens pressure fluid penetrates into it from the pressure chamber 20 via the axial bore 38 and the first radial bore 39. As a result of the larger piston surface which is created, on which the pressure medium acts, the force which the two coupled pistons exert on the piston projection 6 formed on the first piston 7 increases. The piston projection 6 is then pressed out of the housing bore 8 by this increased force, whereupon it actuates the clamping device 3.

In this example the actuation of the clamping device takes place as shown with the cooperation between the cooperating pin and inclined slot elements converting the axial movement of the piston projection 6 into parallel clamping movement of the clamping fingers 4.

The retraction of the piston projection 6 takes place by reducing the pressure in the first pressure chamber 11 and in the second pressure chamber 20 and by simultaneously introducing pressure fluid into the first resetting chamber 13 via the second connection duct 33 and into the further resetting chamber 34. The pressure fluid used for retraction of the piston projection 6 enters the second resetting chamber from the first resetting chamber via the radial bore 36, the axial bore 45 in the first piston 7 or piston extension 6, the axial bore 37 and the radial bore 35. In this way the two coupled pistons move upwardly again (as seen in FIG. 1), and retract the piston projection 6 through the central passage 15 in the housing plug 16 into the housing bore 8 again. This movement releases the clamping device and the clamping fingers 4 move apart from one another (or towards one another if the device is laid out for internal clamping, for example when lifting a cylindrical article from the inside).

In another embodiment as shown in FIG. 2 the first piston 7 and the second piston 8 are not screwed together, instead the piston projection 25 of the second piston 18 simply contacts the first piston 7. In this embodiment of the grasping device in accordance with the invention the resetting force is not produced by introducing pressure fluid into the resetting chambers, but instead by a compression spring 31 which is arranged between the housing plug 16 and the base side 14 of the first piston 7 facing the housing plug.

The cylinder sleeve 22 shown in FIG. 2 is divided into a first cylinder sleeve part 26 and a second cylinder sleeve part 27.

The transverse cylinder-partioning wall is, in the embodiment of FIG. 2, formed on the first cylinder sleeve part 26.

The grasping device of the invention can be provided both with the clamping device 3 as shown in FIGS. 1 and 2 with clamping fingers which move in parallel towards and away from one another and can also, without restriction, have a clamping device 3, as shown in FIG. 3, in which the clamping fingers are mounted on respective pivots so that they can be moved angularly relative to one another between their clamped and released positions.

I claim:

1. Apparatus for handling equipment comprising a clamping device having at least two clamping fingers which are movable relative to one another and mounted on a housing; and a clamping finger actuating device provided in the housing and having at least first and second piston-in-cylinder units coaxially disposed behind one another, coupled together in force transmitting relationship, and simultaneously energisable with pressure fluid in the same sense.

2. Apparatus in accordance with claim 1, wherein the force transmitting relationship is established by means forming at least one threaded connection between the pistons of said first and second piston-in-cylinder units.

3. Apparatus in accordance with claim 1, wherein the clamping device has clamping fingers movable parallel to one another.

4. Apparatus in accordance with claim 1, wherein the clamping device has clamping fingers which move at an angle to one another.

5. A grasping apparatus for handling equipment comprising a clamping device having at least first and second clamping fingers which are movable relative to one another and mounted on a housing; and a clamping finger actuating device provided in the housing and having at least first and second piston-in-cylinder units coaxially disposed behind one another, coupled together in force transmitting relationship, and energisable with pressure fluid in the same sense, the cylinders of said first and second piston-in-cylinder units being separated from each other by a transverse cylinder-partitioning wall, the piston of the second piston-in-cylinder unit including a central projection sealingly passing through the transverse cylinder partitioning wall and contacting the piston of the first piston-in-cylinder unit, which is disposed adjacent the clamping fingers, with the piston projection defining the force transmitting relationship.

6. Apparatus in accordance with claim 5, wherein the means forming at least one threaded connection further comprises an axially disposed threaded fastener extending from one of said pistons to the other said piston through said piston projection.

7. Apparatus in accordance with claim 6, wherein the piston of said first piston-in-cylinder unit also includes a piston projection; and wherein said threaded fastener has a head which bears on the piston of said second piston-in-cylinder unit and threads in engagement with a threaded bore in said piston projection of the piston of said first piston-in-cylinder unit.

8. Apparatus in accordance with claim 5, wherein each of said piston-in-cylinder units has a respective pressure chambers on one side of the associated piston and a respective resetting chamber on the other side of the associated piston; and including passage means for connecting the pressure chamber of said first piston-in-cylinder unit to the pressure chamber of said second piston-in-cylinder unit.

9. Apparatus in accordance with claim 8, wherein said passage means is provided in said piston projection.

10. Apparatus in accordance with claim 8, including further passage means for connecting said resetting chambers to each other.

11. Apparatus in accordance with claim 10, wherein said further passage means is provided in the piston of said first piston-in-cylinder unit and in said piston projection.

12. Apparatus in accordance with claim 8, including at least one compression spring arranged in at least one of said resetting chambers and exerting an axial resetting force on the associated piston.

13. Apparatus in accordance with claim 8, wherein the cylinders of said piston-in-cylinder units are formed by a cylinder sleeve arranged in a bore of the housing; and wherein the transverse cylinder-partioning wall is formed on the cylindrical sleeve.

14. Apparatus in accordance with claim 13, wherein said cylindrical sleeve is made in several parts.

15. Apparatus in accordance with claim 8, wherein said passage means is formed in the cylinder walls of said piston-in-cylinder units.

16. Apparatus in accordance with claim 10, wherein said further passage means is formed in the cylinder walls of said piston-in-cylinder units.

* * * * *